(12) United States Patent
Collinson (10) Patent No.: US 12,220,078 B2
(45) Date of Patent: Feb. 11, 2025

(54) LIQUID HEATING VESSELS

(71) Applicant: Different Kettle of Fish Limited, Isle of Man (GB)

(72) Inventor: Marc Gibson Collinson, Crosby (GB)

(73) Assignee: DIFFERENT KETTLE OF FISH LIMITED, Douglas (IM)

(*) Notice: Subject to any disclaimer, the term of this patent is extended or adjusted under 35 U.S.C. 154(b) by 823 days.

(21) Appl. No.: 17/294,936

(22) PCT Filed: Nov. 19, 2019

(86) PCT No.: PCT/GB2019/053278
§ 371 (c)(1),
(2) Date: May 18, 2021

(87) PCT Pub. No.: WO2020/104793
PCT Pub. Date: May 28, 2020

(65) Prior Publication Data
US 2022/0007873 A1    Jan. 13, 2022

(30) Foreign Application Priority Data
Nov. 19, 2018    (GB) ..................................... 1818785

(51) Int. Cl.
*A47J 27/21*    (2006.01)
*H05B 6/12*    (2006.01)

(52) U.S. Cl.
CPC ....... *A47J 27/211* (2013.01); *A47J 27/21016* (2013.01); *A47J 27/21075* (2013.01); *A47J 27/21191* (2013.01); *H05B 6/1209* (2013.01)

(58) Field of Classification Search
CPC .... H05B 2213/06; H05B 6/12; H05B 6/1209; H05B 2206/023; H05B 6/062;
(Continued)

(56) References Cited

U.S. PATENT DOCUMENTS 10,405,377 B2    9/2019    Kumar
2008/0066751 A1*    3/2008    Polacsek ............... A61M 16/16
                                                                    128/204.17
(Continued)

FOREIGN PATENT DOCUMENTS

CN    1545966 A    11/2004
CN    2708799 Y    7/2005
(Continued)

OTHER PUBLICATIONS

JP Office Action for JP Patent Application No. 2021-527835 dated Jun. 27, 2023.
Chinese office action for CN201980076327.8 dated Dec. 27, 2021.

*Primary Examiner* — Chris Q Liu
(74) *Attorney, Agent, or Firm* — Getz Balich LLC (57) ABSTRACT

A liquid heating device includes a liquid heating vessel and a ferromagnetic heating plate arranged to be located inside the vessel adjacent to the vessel base. The heating plate is arranged to be movable vertically away from the vessel base. An arrangement to lift the heating plate includes a thermally sensitive actuator. The heating plate is coupled to the thermally sensitive actuator. The thermally sensitive actuator includes a means to store energy, a steam chamber fluidly connected to the vessel, and a releasable latching mechanism for the actuator which incorporates a thermally sensitive device set to operate at a predetermined temperature when influenced by steam entering the steam chamber from the vessel. The thermally sensitive actuator further includes means to facilitate a manual intervention of the actuator's operation that permits a user to set or reset the actuator's position.

18 Claims, 10 Drawing Sheets

(58) Field of Classification Search
CPC . H05B 6/108; A47J 27/62; A47J 36/20; A47J 36/2411; A47J 36/2433; A47J 36/2444; A47J 36/2466; A47J 36/32; A47J 27/004; A47J 27/04; A47J 27/21008; A47J 27/21016; A47J 27/2105; A47J 27/21075; A47J 27/21083; A47J 27/211; A47J 27/56; A47J 31/401; A47J 31/4485; A47J 31/4489; A47J 36/02; A47J 36/04; A47J 37/0611; A47J 43/0465
USPC ........ 219/201, 438, 621, 626, 627; 99/323.1
See application file for complete search history.

(56) References Cited

U.S. PATENT DOCUMENTS

| | | | |
|---|---|---|---|
| 2010/0000980 A1 | 1/2010 | Popescu | |
| 2010/0326284 A1 | 12/2010 | Volz | |
| 2014/0091083 A1* | 4/2014 | McGarvey | A47J 36/2433 219/634 |
| 2017/0049260 A1* | 2/2017 | Beber | A47J 31/4403 |
| 2019/0246833 A1 | 8/2019 | Tweel | |
| 2022/0151425 A1 | 5/2022 | Hellmers | |

FOREIGN PATENT DOCUMENTS

| | | |
|---|---|---|
| CN | 2803197 Y | 8/2006 |
| CN | 101019736 A | 8/2007 |
| CN | 200945093 Y | 9/2007 |
| CN | 101116592 A | 2/2008 |
| CN | 201082114 Y | 7/2008 |
| CN | 202051519 U | 11/2011 |
| CN | 102100484 B | 7/2012 |
| CN | 102072506 B | 10/2012 |
| CN | 103561495 A | 2/2014 |
| CN | 207640171 U | 7/2018 |
| CN | 108562046 A | 9/2018 |
| CN | 111281138 A | 6/2020 |
| DE | 3721200 C2 | 4/1994 |
| DE | 202019103136 U1 | 8/2019 |
| EP | 2737832 A1 | 6/2014 |
| EP | 2928350 B1 | 7/2016 |
| ES | 363738 A1 | 12/1970 |
| FR | 2527916 B1 | 2/1986 |
| FR | 2689748 B1 | 6/1996 |
| GB | 2445780 A | 2/2007 |
| GB | 2552972 B | 1/2020 |
| GB | 2579142 B | 11/2021 |
| IN | 200945093 Y | 9/2007 |
| IN | 102068201 A | 5/2011 |
| JP | H087497 B2 | 1/1996 |
| JP | 3106105 B2 | 11/2000 |
| JP | 2003245197 A | 9/2003 |
| JP | 2008307336 A | 12/2008 |
| JP | 2012505000 A | 3/2012 |
| KR | 101958814 B1 | 3/2019 |
| WO | 9858577 W | 12/1998 |
| WO | 0019872 W | 4/2000 |
| WO | 2010002751 A2 | 1/2010 |
| WO | 2011018645 A2 | 2/2011 |
| WO | 2014102336 A1 | 7/2014 |
| WO | 2016074743 A1 | 5/2016 |
| WO | 2017011442 A1 | 1/2017 |
| WO | 2020064262 A1 | 4/2020 |
| WO | 2020104793 A1 | 5/2020 |
| WO | 2020176952 A1 | 9/2020 |
| WO | 2020245281 A1 | 12/2020 |

* cited by examiner

LIQUID HEATING VESSELS

This application is entitled to the benefit of, and incorporates by reference essential subject matter disclosed in PCT Application No. PCT/GB2019/053278 filed on Nov. 19, 2019, which claims priority to GB Patent Appln. No. 1818785.6 filed Nov. 19, 2018, which are hereby incorporated by reference in their entireties.

BACKGROUND OF THE INVENTION

1. Technical Field

The present invention relates to liquid heating vessels and in particular to an arrangement for a liquid heating device for use with an induction hob.

2. Background Information

Liquid heaters in particular domestic heaters commonly used in the preparation of hot beverages and drinks such as: tea, coffee, chocolate and soups are commonly called a kettle. Generally they are arranged as a functional vessel to accept, contain, heat, and dispense a liquid, commonly water. Induction hobs are becoming increasingly popular in domestic kitchens for the preparation of foods and beverages and to efficiently function require the pots, pans and kettles used upon them to be comprised wholly or in part of magnetic materials.

Common induction kettles are stove top kettles adapted in their construction with ferromagnetic materials incorporated into the base or bottom part of the kettle and when using these on different hobs with varying specifications when heating water to boiling point the water sometimes will boil for a longer time period than is necessary before the hob automatically limits or shuts off power to the induction coil, this causes inefficiencies of power consumed and also causes excessive steam to be generated. To minimize any over boiling it is useful to include a steam whistle as part of the kettle's design so that the automatic control of the hob can be manually interrupted and or the kettle removed from the hob when someone is prompted by the audible whistle. There can be many causes for over boiling: the remoteness of a thermal sensor from the water, different thermal properties of materials, poor contact between the kettle and the hob, included air gaps, the volume of water, the altitude of the location, the position of the kettle upon the surface of the hob and the many variations in the design and construction of such kettles and induction hobs from different manufactures. Should a kettle boil dry then it is undesirable for the induction hob not to automatically turn off and in such a scenario there would be no audible whistle from the kettle.

By way of example prior art CN202051519U and WO2016/074743A1 provide variations to an effective automatic power limiting or shut-off as solution. Whereby both provide kettles configured with a vessel or container for the water to be heated and are comprised of a non-magnetic or non-ferromagnetic materials. Arranged within and located at the bottom or base of the container is a movable magnetic or ferromagnetic heating plate or susceptor that when the water boils is moved upwardly away from the bottom of the vessel by a thermally activated actuator. Variations in the specifications exist however a main differentiator is for WO2016/074743A1 employs a shape memory material that together an intermediary component is both the thermal sensor and the actuator and employs a ferromagnetic heating plate material with a limiting Curie point temperature as a dry boil solution. CN202051519U employs a bi metallic component as the thermal sensor within an assembly that is a known steam switch component commonly used in other kettle arrangements, where the bi metal components movement and force is amplified via a lever, spring and toggle mechanism acting as the actuator to lift the heating plate and so automatically stop the water from over boiling. Herein optional solutions to prevent a dry boil scenario are disclosed being an additional shape memory component located under the heating plate which upon attaining a predetermined temperature above boiling temperature would expand and raise the heating plate away from the base of the vessel, an optional dry boil arrangement discloses a heater plate composed of two or more parts where one part moves in relation to another to reduce the electrical current flowing in the heater plate/s and is actuated by a shape memory material upon it attaining a predetermined temperature.

It has been discovered deficiencies exist with the disclosed prior art. There are many different induction hobs available and each configured and arranged differently and the automatic shut off feature sometimes also known as the (ferromagnetic) object detection feature exhibits different or varying levels of sensitivity to the heating plate when lifted and so does not reliably or consistently provide an automatic power limit to the hob or automatically turn off the hob when the water boils. The heating plates and arrangements disclosed in the prior art are configured to cause the heating plate to either tilt in an unregulated orientation when lifted with no arrangement for guidance of the heating plate and so the heating plate orientation is inconsistent and unpredictable during and when it has been lifted and the alternative prior art discloses a predictable and consistent while rotating heating plate, rotating about a pivot fixed to the bottom inside surface of the vessel however the heating plate in such an arrangement varies or increases its angle of inclination relative to the base of the vessel while and when it is lifted. In both embodiments the automatic power limiting or switch off via the hob's object detection sensing feature operates unreliably.

The present invention provides an arrangement for a kettle such that it operates correctly in a consistent, reliable and safe way.

CN200945093Y discloses a cooking utensil for an induction hob wherein a magnetically-conductive heating body is arranged in a vessel and a central shaft is arranged on the magnetically-conductive heating body. The central shaft passes through a spring chamber with a built-in compression spring arranged at the bottom of a cover body that is arranged at the top of the vessel. A fixing pin is arranged on the central shaft in the cover body. A bimetal piece is arranged with one end fixed to the inner bottom of the cover body and the other end engageable with the fixing pin. A handle arranged at the top end of the central shaft enables a user to press down the magnetically-conductive heating body to the bottom of the vessel to commence inductive heating, thereby compressing the compression spring, and engaging the free end of the bimetal piece over the fixing pin. As the temperature in the vessel rises, steam is generated and enters the cover body through a steam guiding hole, thereby increasing the temperature of the bimetal piece. When the temperature reaches a certain value, the bimetal piece is deformed upwards, the fixing pin is disengaged and the central shaft moves upwards under the force of the compression spring, so that the magnetically-conductive heating body is lifted to be separated from the bottom of the vessel.

It has been discovered deficiencies exist with the disclosed prior art. The arrangement seen in CN200945093Y requires the bimetal piece to deform before the central shaft is able to move upwards under the force of the compression spring. Manual intervention is not possible to lift the magnetically-conductive heating body. Furthermore, when returning the magnetically-conductive heating body to the bottom of the vessel, the bimetal piece must cool down and reset for the fixing pin to be engaged.

The present invention provides an arrangement for a kettle such that it is possible for a user to set or reset a lifting arrangement for a ferromagnetic heating plate.

SUMMARY OF THE INVENTION

The present invention as disclosed in the following description relates to an arrangement for a liquid heating device (a kettle) for use on an induction hob that addresses the deficiencies of the prior art as described above.

According to the present invention there is provided a liquid heating device for use on an induction hob as defined by claim 1.

A kettle is disclosed configured with a vessel to accept, contain, heat, and dispense water and is made from a non-ferromagnetic material. The vessel is preferably configured with an opening in the top, side walls and a base and can accept and contain water within it. Preferably the base of the vessel is substantially flat so as to be capable of intimate proximity to the induction hobs top surface. Further preferably the vessel is configured with a spout to aid pouring of the contained water from the vessel and/or the vessel is also configured with a handle to aid pouring, filling and general human handling and positioning of the kettle. The opening in the top of the vessel is preferably configured with a lid that is movable and capable of substantially closing the opening in the top of the vessel, however the spout remains capable of functioning and permitting the pouring of water even if the lid is closed.

A ferromagnetic heating plate is arranged to be located inside the vessel adjacent to the base of the vessel. The ferromagnetic heating plate is arranged to be movable, movable vertically in a substantially perpendicular direction away from the base of the vessel and return. Moving the whole of the ferromagnetic base equally in distance provides for the greatest reduction of induced electric current through it therefore providing an improved means for the induction hobs object detection sensing feature to operate with greater reliably than the prior art discussed above.

An arrangement to lift the ferromagnetic heating plate comprises a thermally sensitive actuator, which is a device comprising a connector, a guide, a means to store energy such as a spring, a push-button or switch providing a means to facilitate a manual intervention of the actuators operation and permitting a user to set or reset the actuators position, a steam chamber fluidly connected to the upper portion of the main body of the vessel, a releasable latching or retaining arrangement for the actuator which incorporates a thermally sensitive device set to operate at a predetermined temperature when influenced by the proximity of steam entering the steam chamber from boiling water in the vessel. The ferromagnetic heating plate is mechanically coupled to the thermally sensitive actuator, preferably joined to a connector where the connector is a substantially a structurally rigid component that facilitates and ensures that the movement is repeatable and guided. The connector is substantially a structurally rigid element and the ferromagnetic heating plate attached or joined to the connector is configured in a preferable cantilevered arrangement. The thermally sensitive actuator's latching, holding retaining arrangement can be optionally manually overridden or released by physically pressing down on the push-button or switch to then operate a push to release mechanism whereby the holding latching or retaining arrangement is released by moving or deflecting part of that mechanism.

The thermally sensitive actuator is arranged to be partly inside and partly outside of the vessel however in an alternate arrangement the device is optionally arranged wholly inside the vessel. Some components of the mechanism can therefore be incorporated as part of and or separately within the kettle's attached handle and/or the kettle's lid.

It is preferred that the ferromagnetic heating plate is manufactured from a material with a predetermined Curie Point temperature and that the Curie point temperature is within the range, not below 100 Degrees Celsius and not above 360 degrees Celsius. More preferably the Curie point temperature is within the range, not below 110 degrees Celsius and not above 260 degrees Celsius. Employing ferromagnetic materials with customizable maximum attainable temperatures ensures that the kettle remains safe and continues to be usable following a boil dry scenario when the kettle operates incorrectly and continues to boil the water until the kettle is dry or either a no fill scenario of use when the kettle is switched on before filling with water. In both scenarios without water no steam can be generated within the vessel and so the steam activated temperature sensor that is fluidly connected to the vessel and configured as part of the thermally sensitive actuator's latching, holding retaining mechanism will not operate. A property of ferromagnetic materials is that once the temperature reaches its specified Curie point temperature the material loses its permanent magnetic properties and so the induction hobs object detection sensing feature then limits the power to the induction coil or shuts down power to the coil and the hob switches off automatically.

DETAILED DESCRIPTION

Induction heating provides a clean, responsive, controllable, safe and efficient method of preparing foods and hot beverages. Modern induction hobs are commonly configured with a means to limit or stop the operation of the induction hob should it be unable to detect a ferromagnetic object placed and located correctly upon the hob's cook surface commonly referred to as object detection sensing feature which then automatically limits the power to the induction coil or shuts down power to the coil and the hob switches off. This invention utilizes this function.

Most commonly ferromagnetic materials are arranged to be a part of the base or bottom of a vessel so that when heating they are positioned in close proximity to an induction coil located beneath the cook surface of an induction hob. Commonly an induction hob is arranged with at least one induction coil located within the hob and the pot, pan or kettle is positioned above it, a high frequency alternating electric current is passed through the coil and the consequent oscillating magnetic field induces eddy currents causing resistive heating of the magnetic materials and so the vessel. Through conduction then the contents of the vessel are heated.

Figure 1:
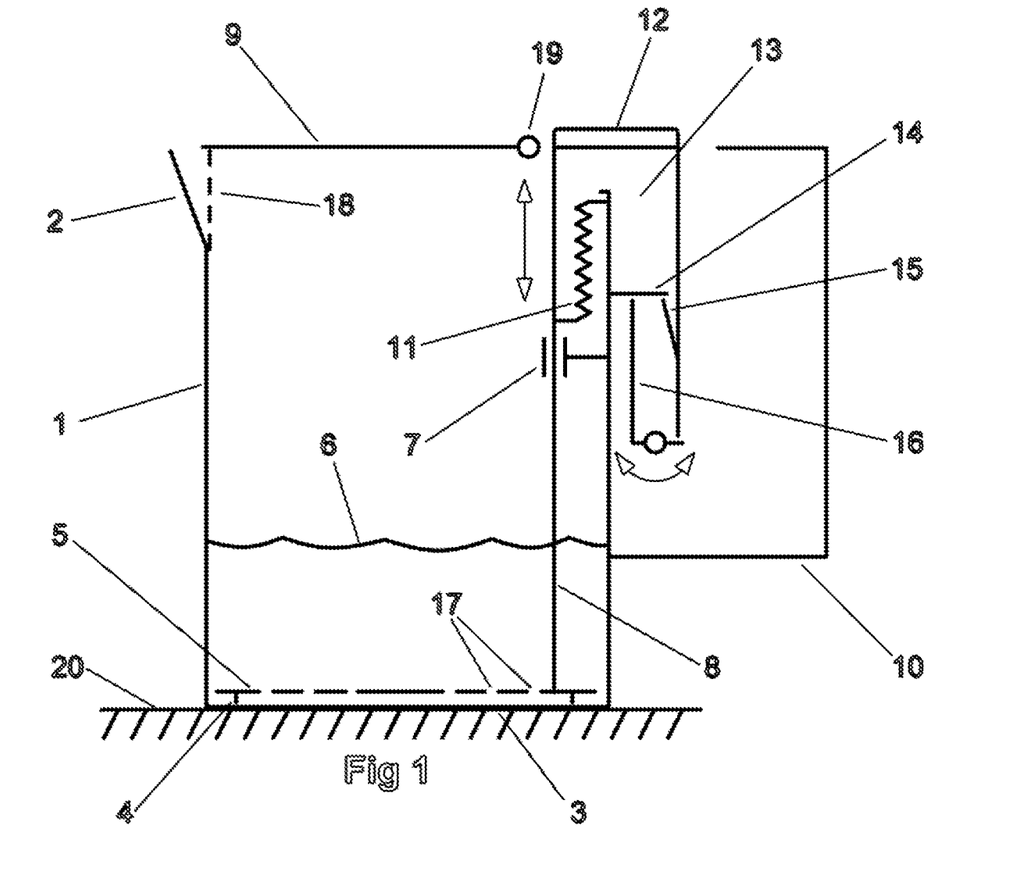
FIG. 1 shows a schematic side view of the kettle and its arrangement in cross-section.
Figure 2:
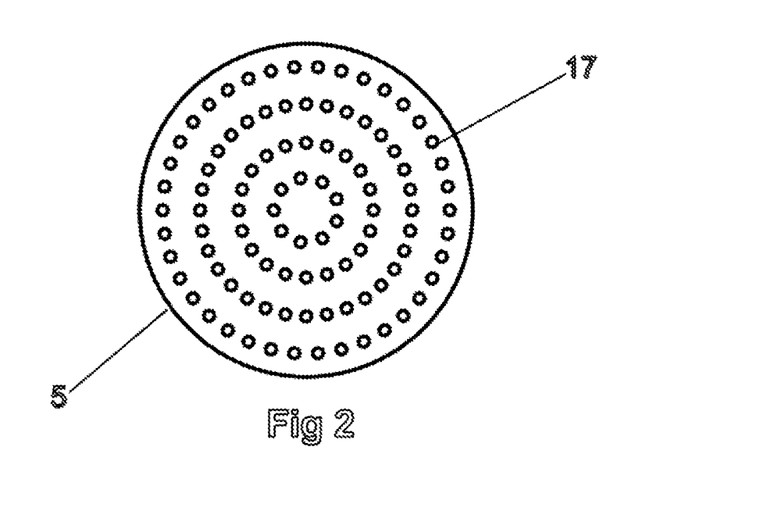
FIG. 2 shows a plan view of the Ferromagnetic heating plate.

A kettle is disclosed configured with a vessel to accept, contain, heat, and dispense water and is made from a non-ferromagnetic material. The vessel is configured with an opening in the top 9 side walls 1 and a base 8 and can accept and contain water 6 within it. The base of the vessel is substantially flat so as to be capable of intimate proximity to the induction hobs top surface 20. Further the vessel is configured with a spout 2 to aid pouring of the contained water from the vessel the vessel is also configured with a handle 10 to aid pouring, filling and general human handling and positioning of the kettle. The handle can optionally be configured as an attachment to the vessel or formed as an integral homogeneous non-ferromagnetic material part of the vessel itself. The opening in the top of the vessel is configured with a lid that is movable 19 and capable of substantially closing the opening in the top of the vessel, however the spout remains capable of functioning and permitting the pouring of water even if the lid is closed. A filter element 18 is arranged to prevent scale from being dispensed and to also controllably restrict escaping steam so as to ensure a positive flow of steam to the steam chamber 13. The non-ferromagnetic material is preferably heat resilient and or resistant. A ferromagnetic heating plate 5 is arranged to be located inside the vessel adjacent to the base 3 of the vessel and in intimate proximity to the inside surface of the vessels base such to be in a substantially planar relationship. The ferromagnetic heating plate is arranged to be movable, movable vertically in a substantially perpendicular direction for the whole or part of its travel away from the base of the vessel and or top surface of the hob 20 and thereafter return manually via actuation of the push-button. The orientation of the ferromagnetic heating plate while moving remains substantially parallel to the base of the vessel. Moving equally vertically for part or whole of its travel and the whole of the whole of the ferromagnetic base being no longer in contact with the base of the vessel it has been found this provides for the greatest reduction of induced electric current through the ferromagnetic material therefore providing an improved means for the induction hobs object detection sensing feature to operate with greater reliably than the prior art discussed above is capable of achieving. Additionally the distance that the ferromagnetic heating plate is required to move can be reduced and still maintain reliable functionality of the induction hobs object detection sensing feature. The ferromagnetic heating plate optionally can be configured with apertures 17 arranged to aid the convection heat transfer of the water while heating. The ferromagnetic heating plate optionally can be configured with protrusions 4 of between 0.1 mm and 10 mm in height or more preferably between 0.5 mm and 3 mm that function as stand offs from the inside surface of the base of the vessel this is to aid the convection heat transfer of the water while heating and to additionally to provide controlled contact with the base of the vessel. The ferromagnetic heating plate can optionally be encapsulated, coated or electroplated with other materials to provide corrosion protection, materials such as ceramic coatings, vitreous coatings, electroplated metals including but not limited to gold, platinum, silver, stainless steel and others can be used.

An arrangement to lift the ferromagnetic heating plate comprises a thermally sensitive actuator 7,8,11, 12,13,14, 15, 16 which is a device comprising a connector 8, a guide 7, a means to store energy such as a spring 11, a push-button or switch 12 providing a means to facilitate a manual intervention of the actuators operation and permitting a user to set or reset the actuators position, a steam chamber 13 is fluidly connected to the upper portion of the main body of the vessel above the maximum water fill level, a releasable latching or retaining arrangement 15 for the actuator which incorporates a thermally sensitive device 14 set to operate at a predetermined temperature when influenced by the proximity of the elevated temperature of the steam entering the steam chamber 13 from boiling water in the vessel. The thermally sensitive device can be configured and or comprises one or more of the following temperature sensing means: bi metal, shape memory materials (shape memory alloys), phase change materials, electronic and other such temperature sensing devices can be employed to initiate, trigger, release and permit the stored potential energy in the spring 11 to be converted into kinetic energy and cause the actuator to move and lift the ferromagnetic heating plate 5. The ferromagnetic heating plate is mechanically coupled to the thermally sensitive actuator, joined to a connector 8 where the connector is a substantially a structurally rigid component that facilitates and ensures that the movement is repeatable and guided 7, more specifically linearly guided. The connector is substantially a structurally rigid element and not a flexible wire or cord as disclosed in the prior art and the ferromagnetic heating plate attached and or joined to the connector is configured in a preferable cantilevered arrangement. The thermally sensitive actuators latching, holding retaining arrangement 14, 15 can be optionally manually overridden or released by physically pressing down on the push-button or switch 12 to then operate a push to release mechanism 16 whereby the holding latching or retaining arrangement 14, 15 is released by moving or deflecting part of that mechanism 14. Alternative solutions to store the potential energy required to move this arrangement include compressible fluids and gases within a sealed device such as an air spring, helix wire springs, flat springs and could optionally operate in torsion or compression dependent upon variations of the arrangement of the thermally sensitive actuator. The thermally sensitive actuator is arranged to be partly inside and partly outside of the vessel, however in an alternate arrangement the device is optionally arranged wholly inside the vessel. Preferably when parts are arranged inside of the vessel none of those components are comprised of polymer or rubber materials whereas components outside of the vessel can be manufactured and employ polymer or rubber material. Some components of the mechanism can therefore be incorporated as part of and or separately within the kettle's attached handle 10 and or the kettle's lid 9 and or hinge mechanism 19.

It is preferred that the ferromagnetic heating plate is manufactured from a material with a predetermined Curie point temperature and that the Curie point temperature is within the range, not below 100 Degrees Celsius and not above 360 degrees Celsius. More preferably the Curie point temperature is within the range, not below 110 degrees Celsius and not above 260 degrees Celsius. Employing ferromagnetic materials with customizable maximum attainable temperatures ensures that the kettle remains safe and continues to be usable following a boil dry scenario when the kettle operates incorrectly and continues to boil the water until the kettle is dry or either a no fill scenario of use when the kettle is switched on before filling the vessel with water. In both scenarios without water no steam can be generated within the vessel and so the steam activated temperature sensor component 14 that is fluidly connected to the vessel and configured as part of the thermally sensitive actuator's latching, holding retaining mechanism will not operate. A property of ferromagnetic materials is that once the temperature reaches its specified Curie point temperature the material loses its permanent magnetic properties and so the induction hob's object detection sensing feature then limits the power to the induction coil or shuts down power to the coil and the hob switches off automatically without the ferromagnetic heater plate being lifted.

Figure 3:
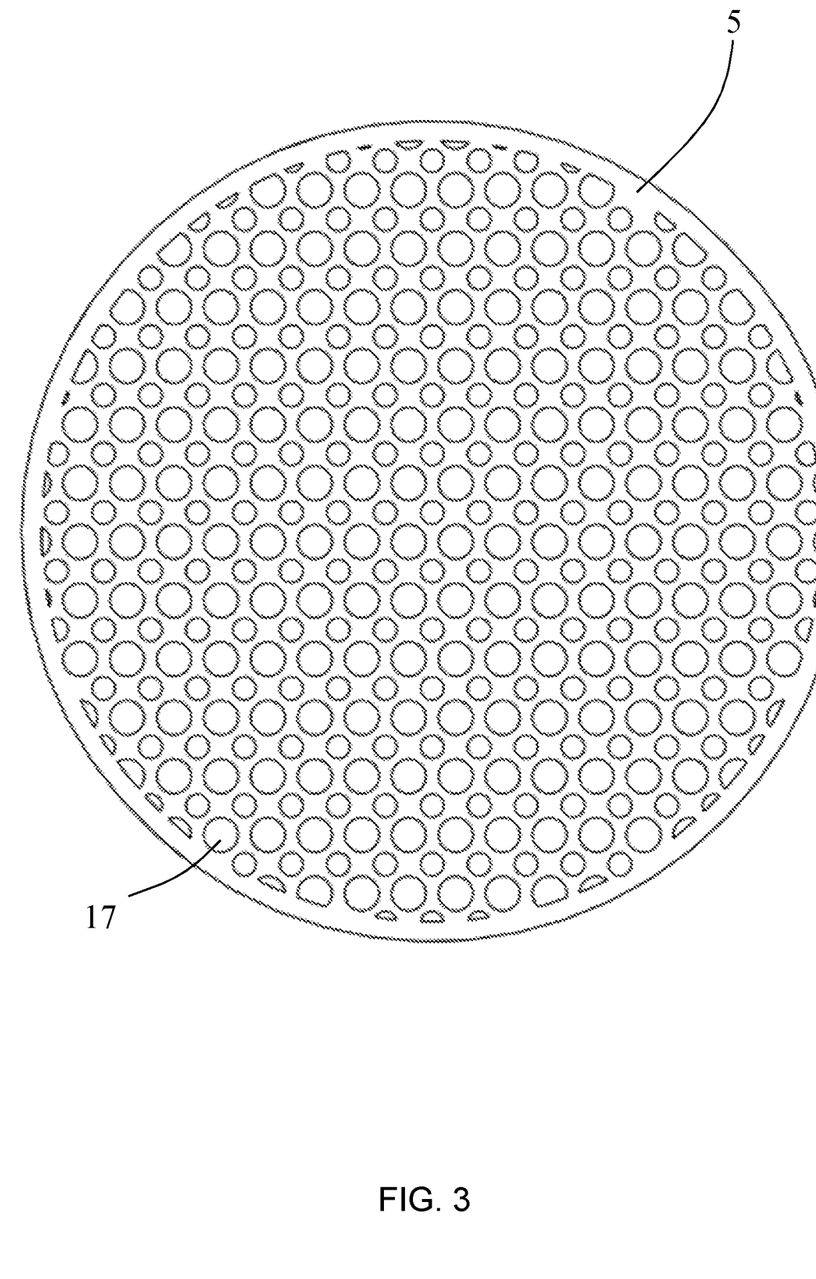
FIG. 3 shows another plan view of the ferromagnetic heating plate.
Figure 4:
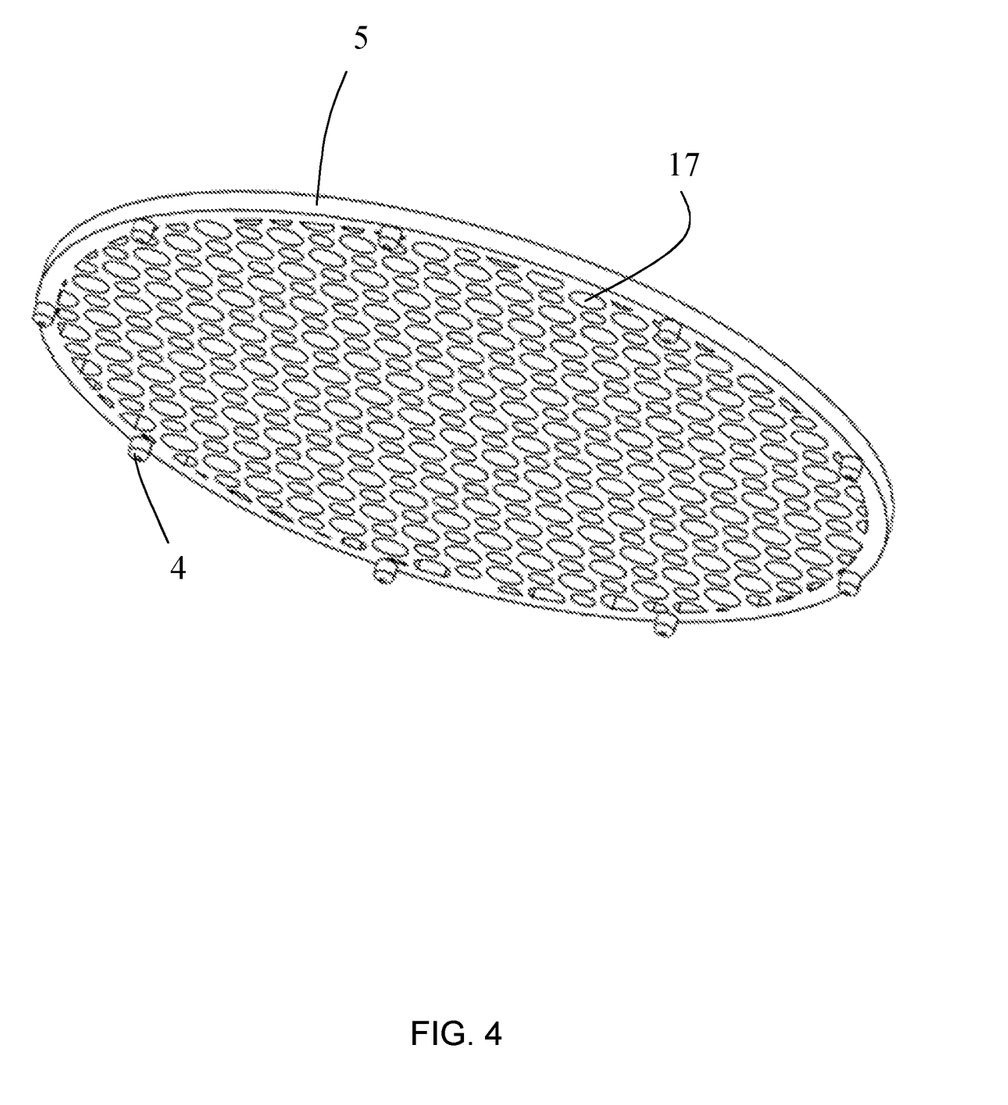
FIG. 4 shows a perspective view of the underside of the ferromagnetic heating plate.

FIGS. 3 and 4 show the ferromagnetic heating plate.

FIG. 3 shows a plan view of the ferromagnetic heating plate 5. The plate 5 comprises an arrangement of perforations 17. The ferromagnetic heating plate 5 optionally can be configured with apertures 17 arranged to aid the convection heat transfer of the water while heating.

FIG. 4 shows an underside view of the ferromagnetic heating plate 5. The ferromagnetic heating plate 5 optionally can be configured with protrusions 4 of between 0.1 mm and 10 mm in height, or more preferably between 0.5 mm and 3 mm, that function as stand offs from the inside surface of the base of the vessel. This is to aid the convection heat transfer of the water while heating and to additionally to provide controlled contact with the base of the vessel. The ferromagnetic heating plate 5 can optionally be encapsulated, coated or electroplated with other materials to provide corrosion protection, materials such as ceramic coatings, vitreous coatings, electroplated metals including but not limited to gold, platinum, silver, stainless steel and others can be used.

Figure 5:
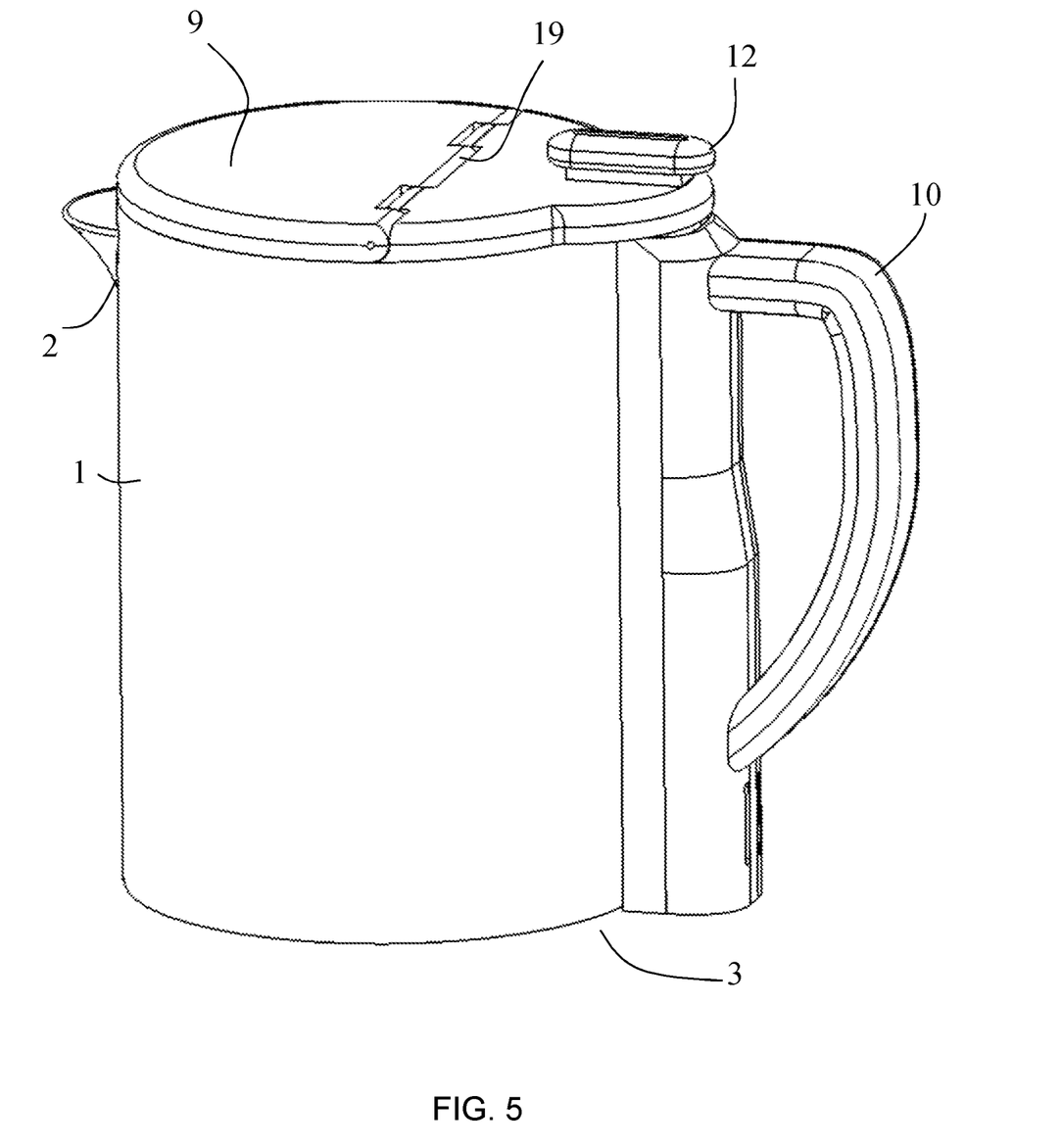
FIG. 5 shows a side view of the kettle.

FIG. 5 shows a side perspective view of the kettle, including the sidewall 1 of the vessel/kettle, the spout 2 of the vessel/kettle, the bottom or base 3 of the vessel/kettle, the movable lid 9 in closed position covering the open top of vessel/kettle, the handle 10, the push-button or switch 12, and the hinge 19 for the lid 9.

Figure 6:
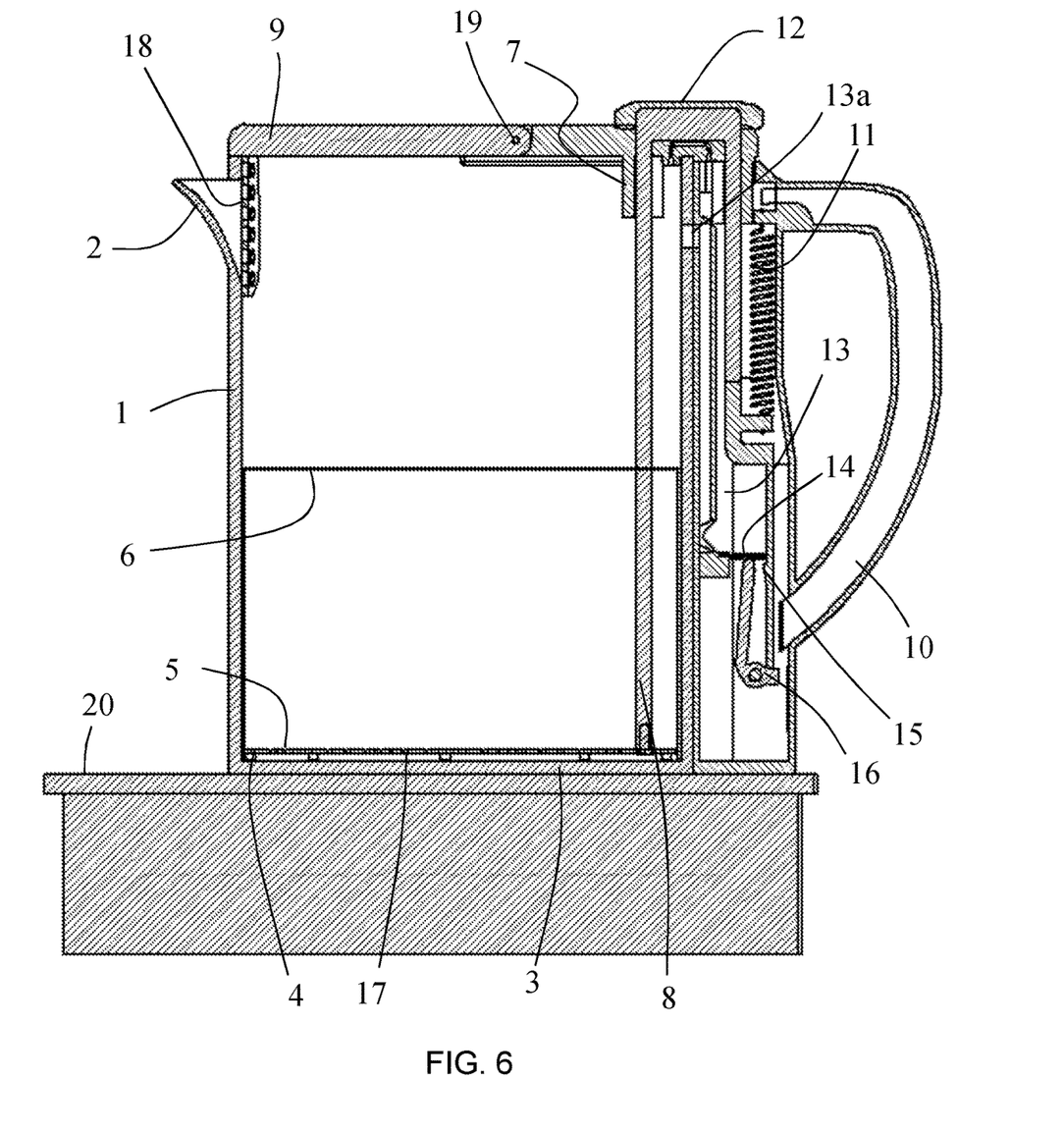
FIGS. 6-8 are cross-sectional views of the FIG. 1 kettle and its arrangement, showing different states during operation.

FIG. 6 shows a cross-sectional side view of the kettle shown schematically in FIG. 1 and its arrangement with the ferromagnetic heating plate 5 lowered in a position to begin or continue to heat the water in the kettle. There can be seen the downward protrusions 4 from the ferromagnetic heating plate 5 acting as stand offs. There can also be seen the guide 7 for the connector component 8, the spring 11, the push-button or switch 12, the steam chamber 13, the temperature sensing device 14 as a bi metal component, part of the latching or retaining mechanism 15, and the push to open or latching release mechanism 16. The lifting arrangement for the ferromagnetic heating plate 5 is functionally equivalent to the schematic arrangement seen in FIG. 1, taking into account that the thermally sensitive actuator can be arranged to be partly inside and partly outside of the vessel where water is contained. As seen from FIGS. 1 and 6, the spring 11 can be located inside the vessel or outside the vessel.

In FIG. 6 there can also be seen the arrangement of perforations 17 in the ferromagnetic heating plate 5, the water filter element 18 arranged in the spout 2 to prevent scale from being dispensed and also functioning as a steam escape restrictor, the hinge 19 for the lid 9, and the top surface or cook surface 20 of the induction hob. There is an aperture 13a fluidly connecting the steam chamber 13 to the upper portion of the main body of the vessel above the maximum water fill level 6.

The ferromagnetic heating plate 5 is arranged to be located inside the vessel adjacent to the base 3 of the vessel and in intimate proximity to the inside surface of the vessel's base such to be in a substantially planar relationship. The ferromagnetic heating plate 5 is arranged to be movable, movable vertically in a substantially perpendicular direction for the whole or part of its travel away from the base of the vessel and or top surface of the hob 20 and thereafter return manually via actuation of the push-button 12.

Figure 7:
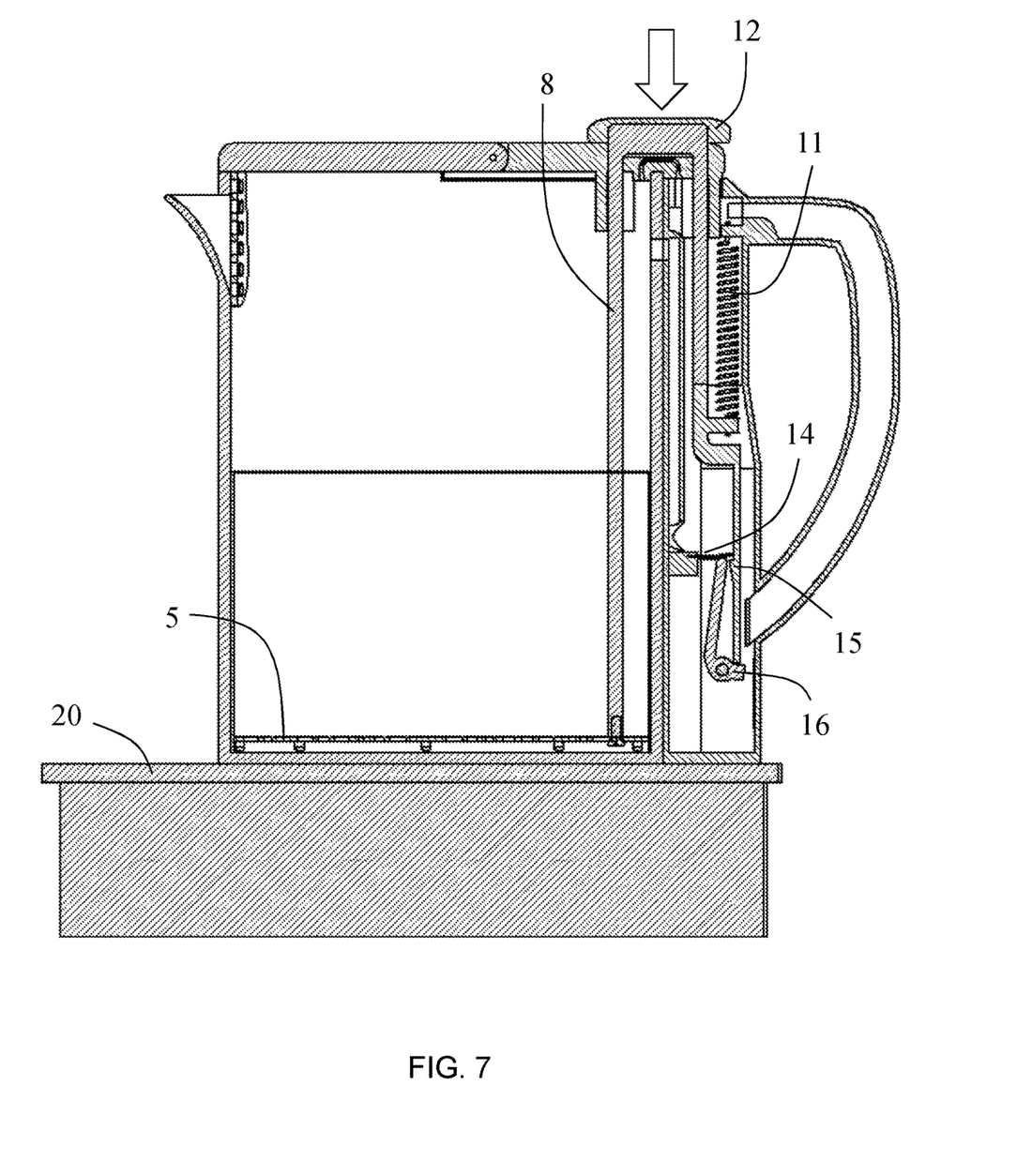
Figure 8:
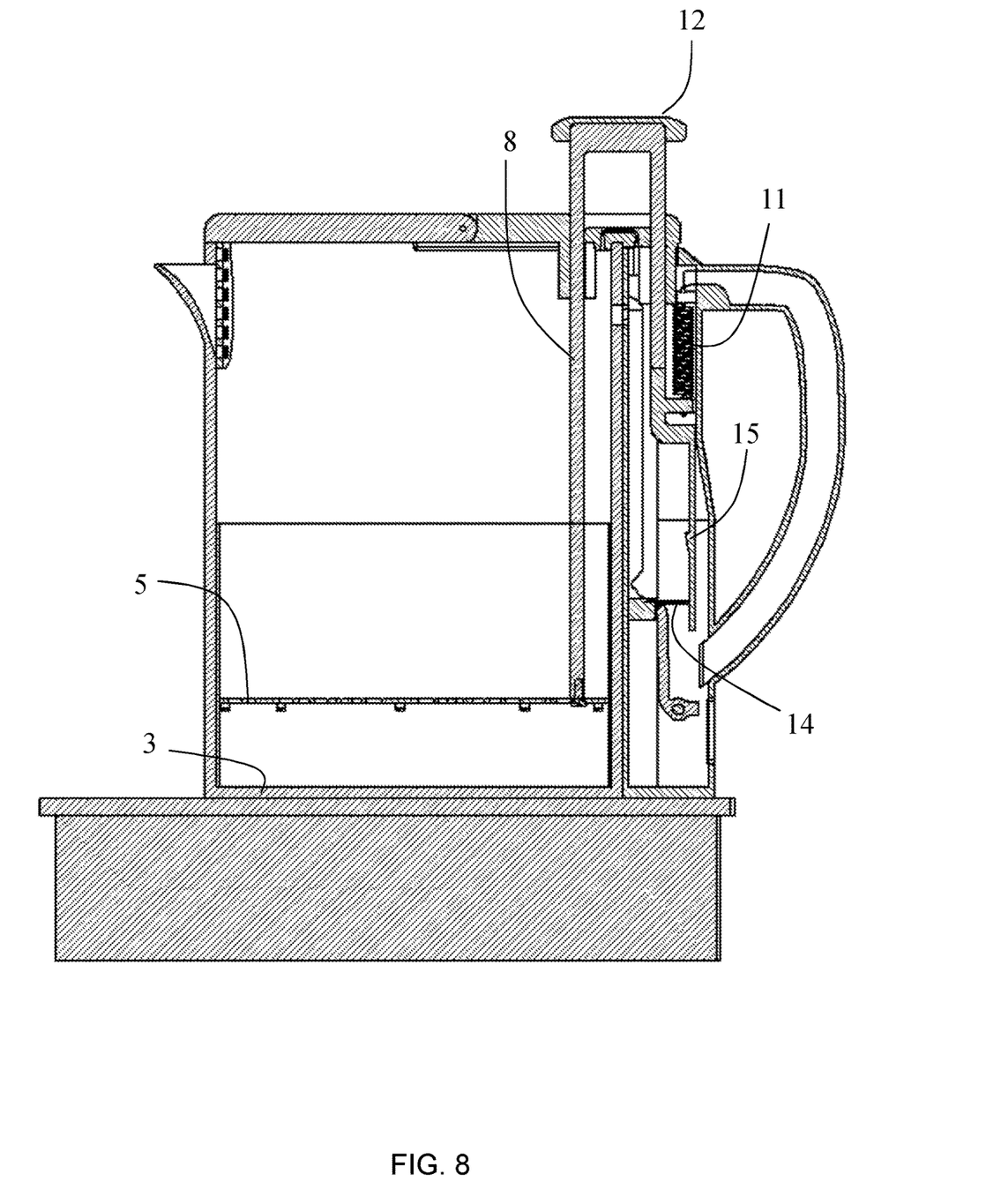

From FIGS. 6-8 it can be seen that the orientation of the ferromagnetic heating plate 5 while moving remains substantially parallel to the base of the vessel. Moving equally vertically for part or whole of its travel and the whole of the ferromagnetic base being no longer in contact with the base of the vessel it has been found this provides for the greatest reduction of induced electric current through the ferromagnetic material therefore providing an improved means for the induction hob's object detection sensing feature to operate with greater reliably than the prior art discussed above is capable of achieving. Additionally the distance that the ferromagnetic heating plate is required to move can be reduced and still maintain reliable functionality of the induction hob's object detection sensing feature.

FIG. 6 shows the kettle and its arrangement with the ferromagnetic heating plate 5 lowered in a position to begin or continue to heat the water in the kettle placed on the top surface or cook surface 20 of the induction hob. The thermally sensitive device 14 is set to operate at a predetermined temperature when influenced by the proximity of the elevated temperature of steam entering the steam chamber 13 from boiling water in the vessel. The device's bimetal 14 acts to initiate, trigger, release and permit the stored potential energy in the spring 11 to be converted into kinetic energy and cause the actuator to move and lift the ferromagnetic heating plate 5.

FIG. 7 shows a cross-sectional side view of the kettle shown schematically in FIG. 1, wherein the thermally sensitive actuator's latching, holding retaining arrangement 14, 15 is manually overridden or released by physically pressing down on the push-button or switch 12 to then operate the push to release mechanism 16 whereby the holding latching or retaining arrangement 14, 15 is released by moving or deflecting part of that arrangement, e.g. by deflecting the bimetal 14. FIG. 7 shows the arrangement when the push-button or switch 12 has been pressed down to operate the push to release mechanism 16. The spring 11 can now act to lift the ferromagnetic heating plate 5 vertically away from the induction hob 20 by lifting the connector 8.

FIG. 8 shows a cross-sectional view of the kettle shown schematically in FIG. 1 with the ferromagnetic heating plate 5 moved away from the base 3 of the vessel following a manual override, as described above with reference to FIG. 7, or after operation (and reset) of the thermally sensitive device 14 when the water within the vessel boils. As can be seen, in this arrangement, release of the latching arrangement 14, 15 permits the stored potential energy in the spring 11 to be converted into kinetic energy and cause the actuator to move and lift the ferromagnetic heating plate 5.

The ferromagnetic heating plate 5 may be returned within proximity of the base 3 of the kettle, as shown in FIG. 6, by another operation of the push-button or switch 12. The pressing of the push-button or switch 12 causes the latching part 15 of the holding latching or retaining mechanism to move downwards below the bimetal 14, and potential energy is stored in the spring 11. The holding latching or retaining mechanism 14, 15 remains in this state until operation of the thermally sensitive device 14 when the water within the vessel boils or until the latching arrangement 14, 15 is manually overridden, as discussed above.

Figure 9:
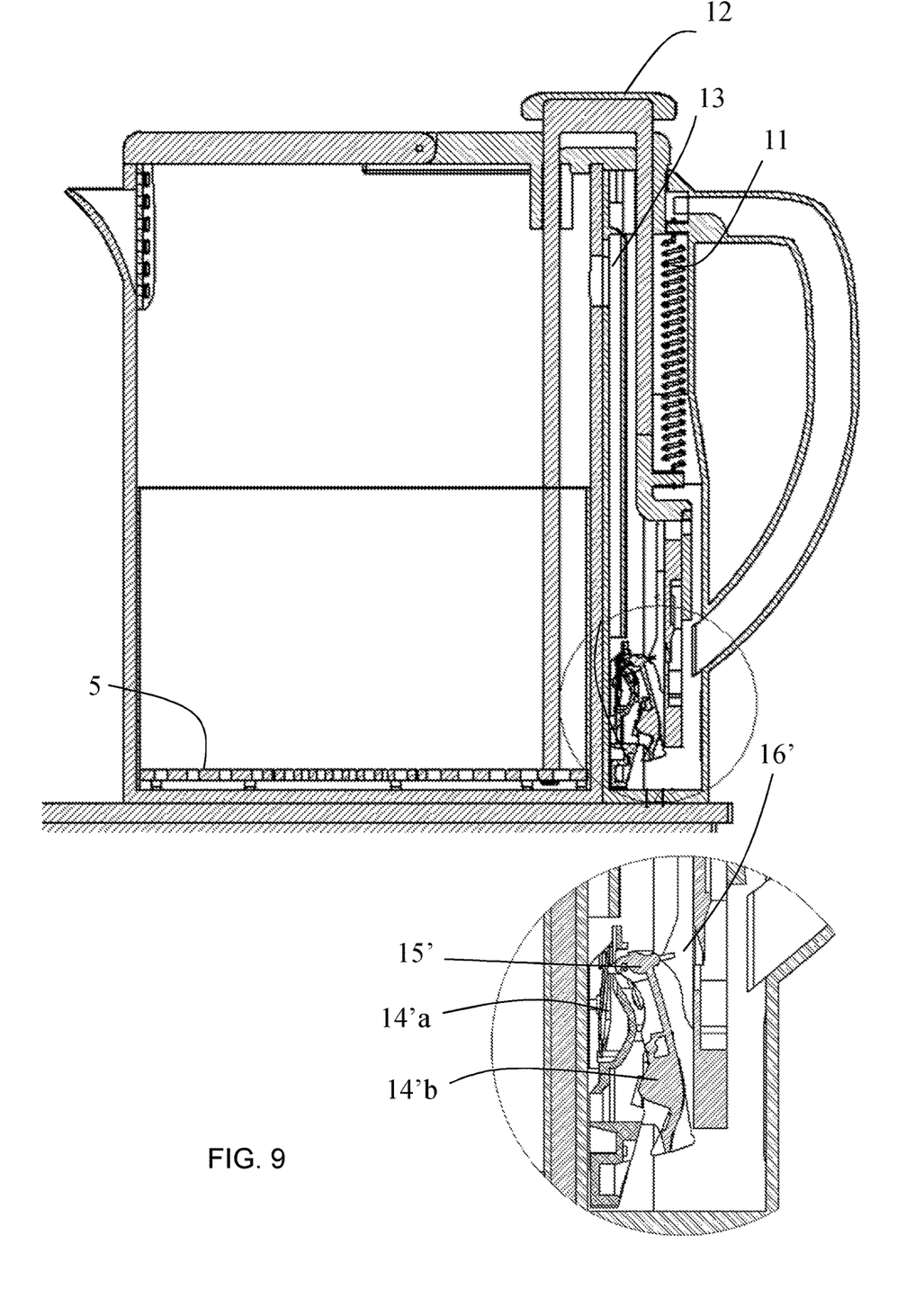
FIGS. 9-11 are cross-sectional views of the kettle and another version of its arrangement, showing different states during operation.

FIG. 9 shows a cross-sectional side view of the kettle and another version of its arrangement with the ferromagnetic heating plate 5 lowered in a position to begin or continue to heat the water in the kettle. Those features that have already been described are given the same reference numerals and will not be described again.

The thermally sensitive device comprises a bimetal 14a' set to operate at a predetermined temperature when influenced by the proximity of the elevated temperature of steam entering the steam chamber 13 from boiling water in the vessel. The device's bimetal 14a' acts to initiate, trigger, release and permit the stored potential energy in the spring 11 to be converted into kinetic energy and cause the actuator to move and lift the ferromagnetic heating plate 5. The bimetal 14a' triggers by acting on a rocker 14b' that pivots a part 15' of the mechanism so as to release the latching mechanism 14', 15'.

Figure 10:
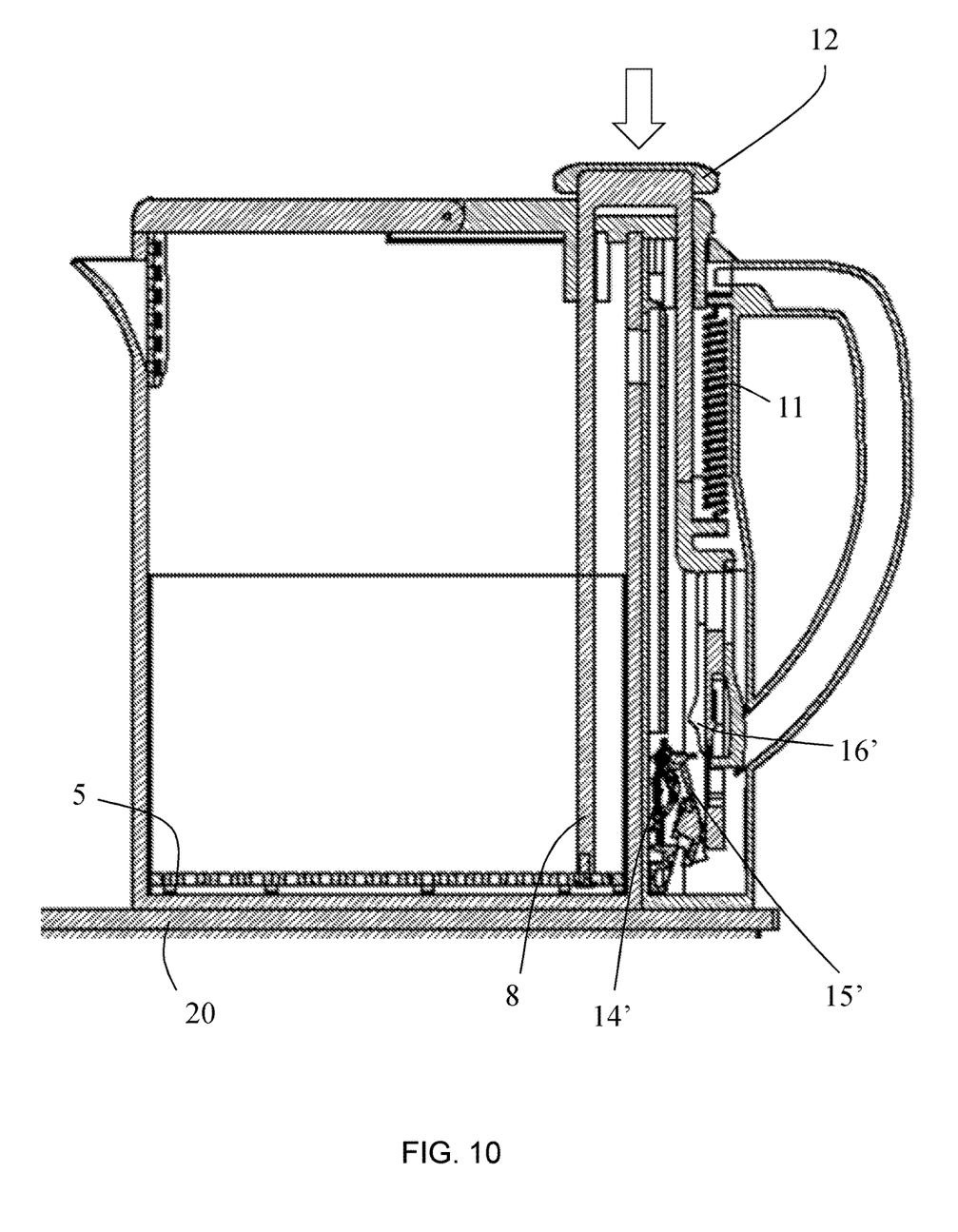

The thermally sensitive actuator's latching arrangement 14', 15' can be optionally manually overridden or released by physically pressing down on the push-button or switch 12 to then operate a push to release mechanism 16' whereby the holding latching or retaining arrangement 14', 15' is released by moving part 15' of that arrangement. FIG. 10 shows the arrangement when the push-button or switch 12 has been pressed down to operate the push to release mechanism 16'. As can be seen in FIG. 10, the push-button or switch 12 has been moved downwards. This means that part of the holding latching or retaining arrangement 14', 15' has been moved or deflected to become separated from the push to release mechanism 16', thereby allowing the stored potential energy in the spring 11 to lift the ferromagnetic heating plate 5 vertically away from the induction hob 20 by lifting the connector 8.

Figure 11:
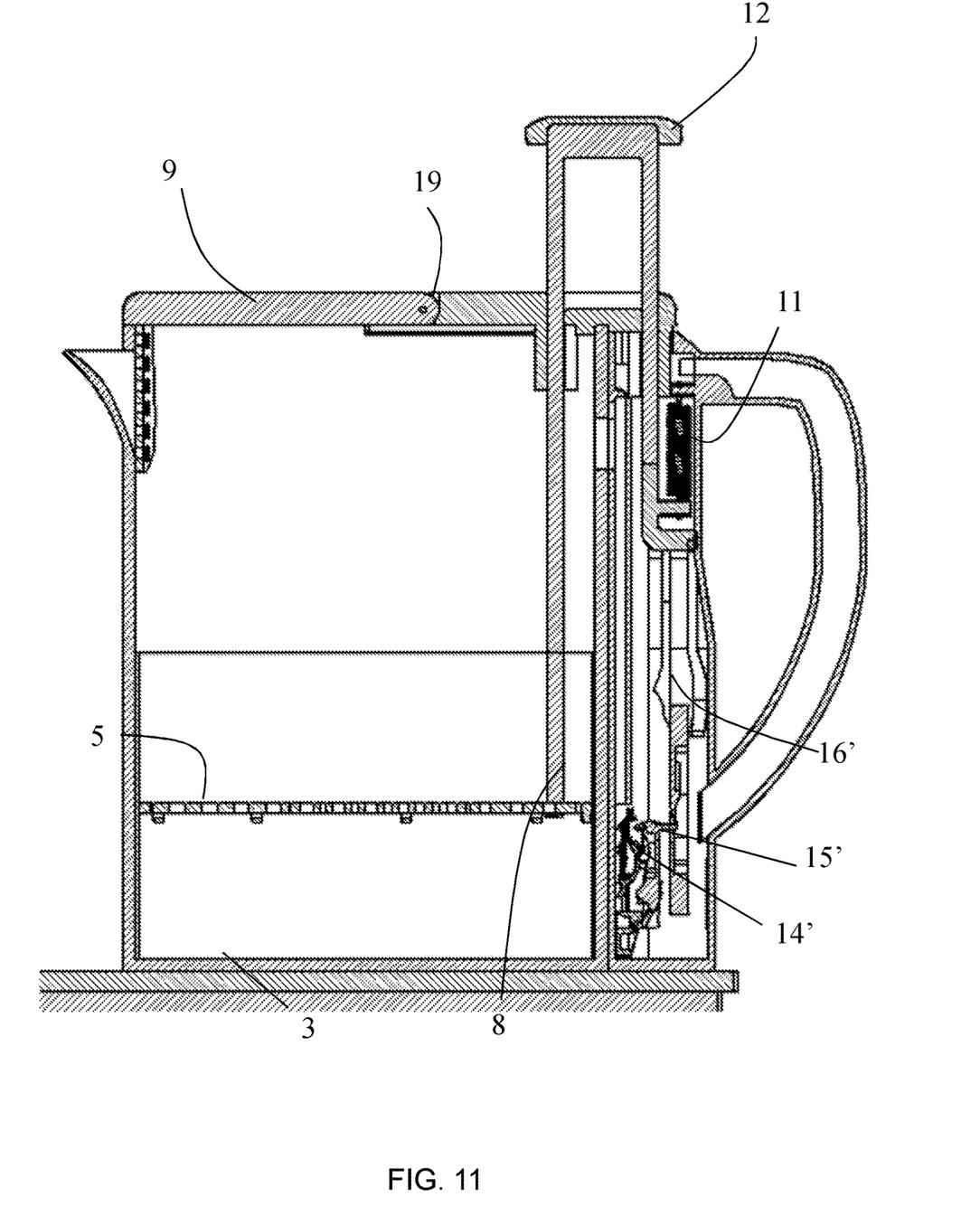

FIG. 11 shows a cross-sectional view of the kettle with the ferromagnetic heating plate 5 moved away from the base 3 of the vessel following a manual override, as described above with reference to FIG. 10, or after operation of the thermally sensitive device 14' when the water within the vessel boils. As can be seen, in this arrangement, release of the latching arrangement 14, 15 permits the stored potential energy in the spring 11 to be converted into kinetic energy and cause the actuator to move and lift the ferromagnetic heating plate 5.

The ferromagnetic heating plate 5 may be returned within proximity of the base 3 of the kettle, as shown in FIG. 9, by operation of the push-button or switch 12. The pressing of the push-button or switch 12 causes the push to release mechanism 16' to move downwards into engagement with the holding latching or retaining mechanism 14', 15', and potential energy is stored in the spring 11. The holding latching or retaining mechanism 14', 15' remains in this state until operation of the thermally sensitive device 14' when the water within the vessel boils or until the latching arrangement 14', 15' is manually overridden, as discussed above.

While the invention has been described with reference to exemplary embodiments and applications scenarios, it will be understood by those skilled in the art that various changes may be made and equivalents may be substituted for elements thereof without departing from the scope of the claims. Therefore, it is intended that the invention not be limited to the particular embodiments disclosed, but that the invention will include all embodiments falling within the scope of the appended claims and can be applied to various application in the industrial as well as commercial field.

What is claimed is:

1. A liquid heating device for use on an induction hob, comprising:
    a vessel to accept, contain, heat and dispense water, the vessel made from a non-ferromagnetic material;
    a ferromagnetic heating plate arranged to be located inside the vessel adjacent to the base of the vessel, wherein the ferromagnetic heating plate is arranged to be movable vertically in a perpendicular direction away from the base of the vessel and return; and
    an arrangement to lift the ferromagnetic heating plate comprising a thermally sensitive actuator, wherein the ferromagnetic heating plate is mechanically coupled to the thermally sensitive actuator;
    the thermally sensitive actuator comprising:
    a means to store potential energy;
    a steam chamber fluidly connected to the vessel; and
    a releasable latching mechanism for the actuator which incorporates a thermally sensitive device set to operate at a predetermined temperature when influenced by the proximity of steam entering the steam chamber from boiling water in the vessel, wherein release of the latching mechanism permits the stored potential energy to be converted into kinetic energy and cause the actuator to move and lift the ferromagnetic heating plate;
    wherein, in a first mode of operation, the latching mechanism is configured to be released when the thermally sensitive device operates at the predetermined temperature so as to permit the stored potential energy to be converted into kinetic energy and cause the actuator to move and lift the ferromagnetic heating plate;
    the liquid heating device further comprising a push-button or switch;
    wherein, in a manual-intervention mode of operation, the latching mechanism is configured to be released by a user pressing down on the push-button or switch so as to permit the stored potential energy to be converted to kinetic energy and cause the actuator to move and lift the ferromagnetic heating plate, whereby the latching mechanism is released by moving or deflecting part of that latching mechanism.

2. The liquid heating device according to claim 1, wherein the orientation of the ferromagnetic heating plate while moving remains parallel to the base of the vessel.

3. The liquid heating device according to claim 1, wherein the thermally sensitive actuator comprises a connector mechanically coupling the ferromagnetic heating plate to the thermally sensitive actuator.

4. The liquid heating device according to claim 3, wherein the connector is a rigid component.

5. The liquid heating device according to claim 3, wherein the ferromagnetic heating plate is attached or joined to the connector in a cantilevered arrangement.

6. The liquid heating device according to claim 3, wherein the thermally sensitive actuator further comprises a guide for the connector.

7. The liquid heating device according to claim 1, wherein the thermally sensitive actuator is arranged to be partly inside and partly outside of the vessel.

8. The liquid heating device according to claim 1, wherein some components of the releasable latching mechanism are incorporated as part of or separately within a handle attached to the vessel.

9. The liquid heating device according to claim 1, wherein the steam chamber is fluidly connected to an upper portion of a main body of the vessel above the maximum water fill level.

10. The liquid heating device according to claim 1, wherein the thermally sensitive device comprises one or more of the following temperature sensing means: bi-metal, shape memory materials, phase change materials, electronic temperature sensing devices.

11. The liquid heating device according to claim 1, wherein the ferromagnetic heating plate is manufactured from a material with a predetermined Curie point temperature and the Curie point temperature is within a range not below 100° C. and not above 360° C.

12. The liquid heating device according to claim 11, wherein the Curie point temperature is within a range not below 110° C. and not above 260° C.

13. The liquid heating device according to claim 1, wherein the ferromagnetic heating plate includes downward protrusions from the ferromagnetic heating plate acting as stand offs.

14. The liquid heating device according to claim 13, wherein the protrusions are of between 0.1 mm and 10 mm in height.

15. The liquid heating device according to claim 14, wherein the protrusions are of between 0.5 mm and 3 mm in height.

16. The liquid heating device according to claim 1, wherein the ferromagnetic heating plate includes an arrangement of perforations therein.

17. The liquid heating device according to claim 1, wherein the ferromagnetic heating plate is encapsulated, coated or electroplated with other materials to provide corrosion protection.

18. The liquid heating device according to claim 1, comprising a spout and a filter element arranged in the spout to prevent scale from being dispensed and to function as a steam escape restrictor.

* * * * *